United States Patent
Ward et al.

(10) Patent No.: US 9,970,681 B2
(45) Date of Patent: May 15, 2018

(54) WATER HEATER APPLIANCE

(71) Applicant: General Electric Company, Schenectady, NY (US)

(72) Inventors: Shaun Michael Ward, Louisville, KY (US); Timothy Scott Shaffer, La Grange, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 82 days.

(21) Appl. No.: 14/748,703

(22) Filed: Jun. 24, 2015

(65) Prior Publication Data

US 2016/0377322 A1 Dec. 29, 2016

(51) Int. Cl.
*G05D 23/13* (2006.01)
*F24H 9/20* (2006.01)

(52) U.S. Cl.
CPC ......... *F24H 9/2007* (2013.01); *G05D 23/132* (2013.01); *G05D 23/134* (2013.01); *G05D 23/1326* (2013.01)

(58) Field of Classification Search
CPC ... F24H 9/2007; F24H 9/2021; G05D 23/132; G05D 23/1326; G05D 23/134
USPC ............... 122/14.3, 14.31, 13.3, 196
See application file for complete search history.

(56) References Cited

U.S. PATENT DOCUMENTS

| | | | | |
|---|---|---|---|---|
| 4,618,091 A | * | 10/1986 | Buzzi | G05D 23/1393 236/12.12 |
| 4,916,436 A | * | 4/1990 | Silliman | G08B 17/06 340/586 |
| 5,701,387 A | * | 12/1997 | McGugan | F24D 17/0073 122/13.3 |
| 2012/0024968 A1 | * | 2/2012 | Beyerle | G05D 23/1346 236/12.11 |
| 2012/0037095 A1 | | 2/2012 | DuPlessis | |
| 2014/0026970 A1 | * | 1/2014 | DuPlessis | G05D 23/132 137/3 |

* cited by examiner

*Primary Examiner* — Alissa Tompkins
*Assistant Examiner* — Benjamin W Johnson
(74) *Attorney, Agent, or Firm* — Dority & Manning, P.A.

(57) ABSTRACT

A water heater appliance includes a tank and a heated water conduit that extends from the tank. A mixing valve is coupled to the heated water conduit, and a mixed water conduit extends from the mixing valve. A thermal mass is positioned on the mixed water conduit, and a thermal safety sensor is positioned at the thermal mass.

17 Claims, 8 Drawing Sheets

WATER HEATER APPLIANCE

FIELD OF THE INVENTION

The present subject matter relates generally to water heater appliances, such as heat pump water heater appliances.

BACKGROUND OF THE INVENTION

Certain water heater appliances include a tank therein. Heating elements, such as gas burners, electric resistance elements, or sealed systems, heat water within the tank during operation of such water heater appliances. In particular, the heating elements generally heat water within the tank to a predetermined temperature. The predetermined temperature is generally selected such that heated water within the tank is suitable for showering, washing hands, etc.

During operation, relatively cool water flows into the tank, and the heating elements operate to heat such water to the predetermined temperature. Thus, the volume of heated water available at the predetermined temperature is generally limited to the volume of the tank. According, water heater appliances are sold in various sizes to permit consumers to select a proper tank volume and provide sufficient heated water. However, large water heater appliances with large tanks occupy large amount of space within a residence or business. In certain buildings, space is limited and/or expensive. Thus, utilizing large water heater appliances can be impractical and/or prohibitively expensive despite needing large volumes of heated water.

To provide relatively large volumes of heated water from relatively small tanks, certain water heater appliances utilize a mixing valve. The mixing valve permits water within the water heater's tank to be stored at relatively high temperatures. The mixing valve mixes such high temperature water with relatively cool water in order to bring the temperature of such water down to suitable and/or more usable temperatures. Thus, such water heater appliance can provide relatively large volumes of heated water without requiring large tanks.

Mixing valves can have certain drawbacks. For example, if the mixing valve fails, water delivered from the water heater appliance can be undesirably hot or cold. To avoid delivering undesirably hot water, certain water heater appliances include temperature sensors that deactivate the water heater appliance's heating elements when tripped. However, during an initial portion of a water draw, a slug of heated water can trip the temperature sensor and cause an inconvenient deactivation of the water heater appliance's heating element.

Accordingly, a water heater appliance having a mixing valve that includes features for limiting delivery of undesirably hot water from the water heater appliance would be useful. In particular, a water heater appliance having a mixing valve that includes features for limiting delivery of undesirably hot water from the water heater appliance while avoiding nuisance tripping would be useful.

BRIEF DESCRIPTION OF THE INVENTION

The present subject matter provides a water heater appliance. The water heater appliance includes a tank and a heated water conduit that extends from the tank. A mixing valve is coupled to the heated water conduit, and a mixed water conduit extends from the mixing valve. A thermal mass is positioned on the mixed water conduit, and a thermal safety sensor is positioned at the thermal mass. Additional aspects and advantages of the invention will be set forth in part in the following description, or may be apparent from the description, or may be learned through practice of the invention.

In a first exemplary embodiment, a water heater appliance is provided. The water heater appliance includes a tank. A heated water conduit extends from the tank. A mixing valve is coupled to the heated water conduit. A mixed water conduit extends from the mixing valve. The mixed water conduit defines a thickness between an inner surface of the mixed water conduit and an outer surface of the mixed water conduit. A thermal mass is positioned on the mixed water conduit. The thermal mass defines a thickness between the inner surface of the mixed water conduit and an outer surface of the thermal mass. The thickness of the thermal mass is greater than the thickness of the mixed water conduit. A thermal safety sensor is positioned at the outer surface the thermal mass.

In a second exemplary embodiment, a water heater appliance is provided. The water heater appliance includes a casing. A tank is disposed within the casing. A heated water conduit extends from the tank. A mixing valve is positioned within the casing and is coupled to the heated water conduit. A mixed water conduit extends from the mixing valve. A thermal mass is positioned on the mixed water conduit at an outer surface of the mixed water conduit. A thermal safety sensor is positioned on the thermal mass such that the thermal mass is positioned between the thermal safety sensor and an inner surface of the mixed water conduit.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention.

In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
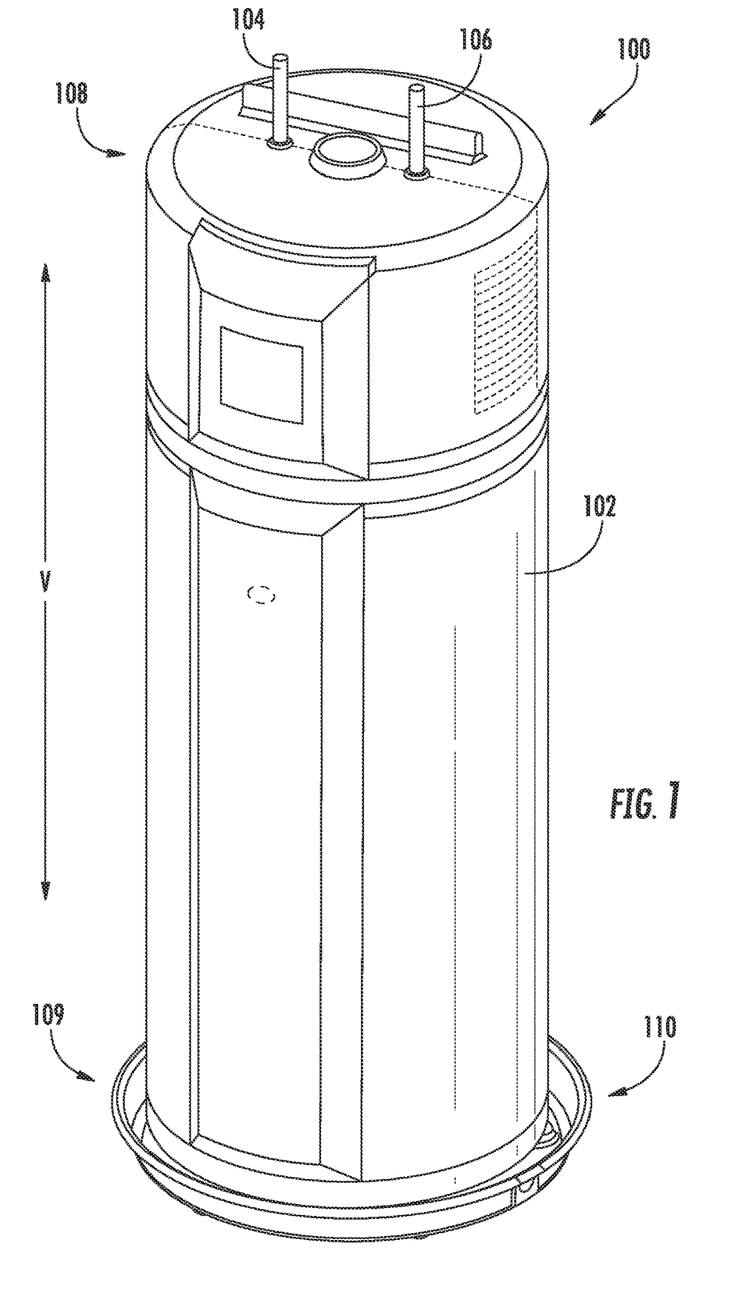
FIG. 1 provides a perspective view of a water heater appliance according to an exemplary embodiment of the present subject matter.
Figure 2:
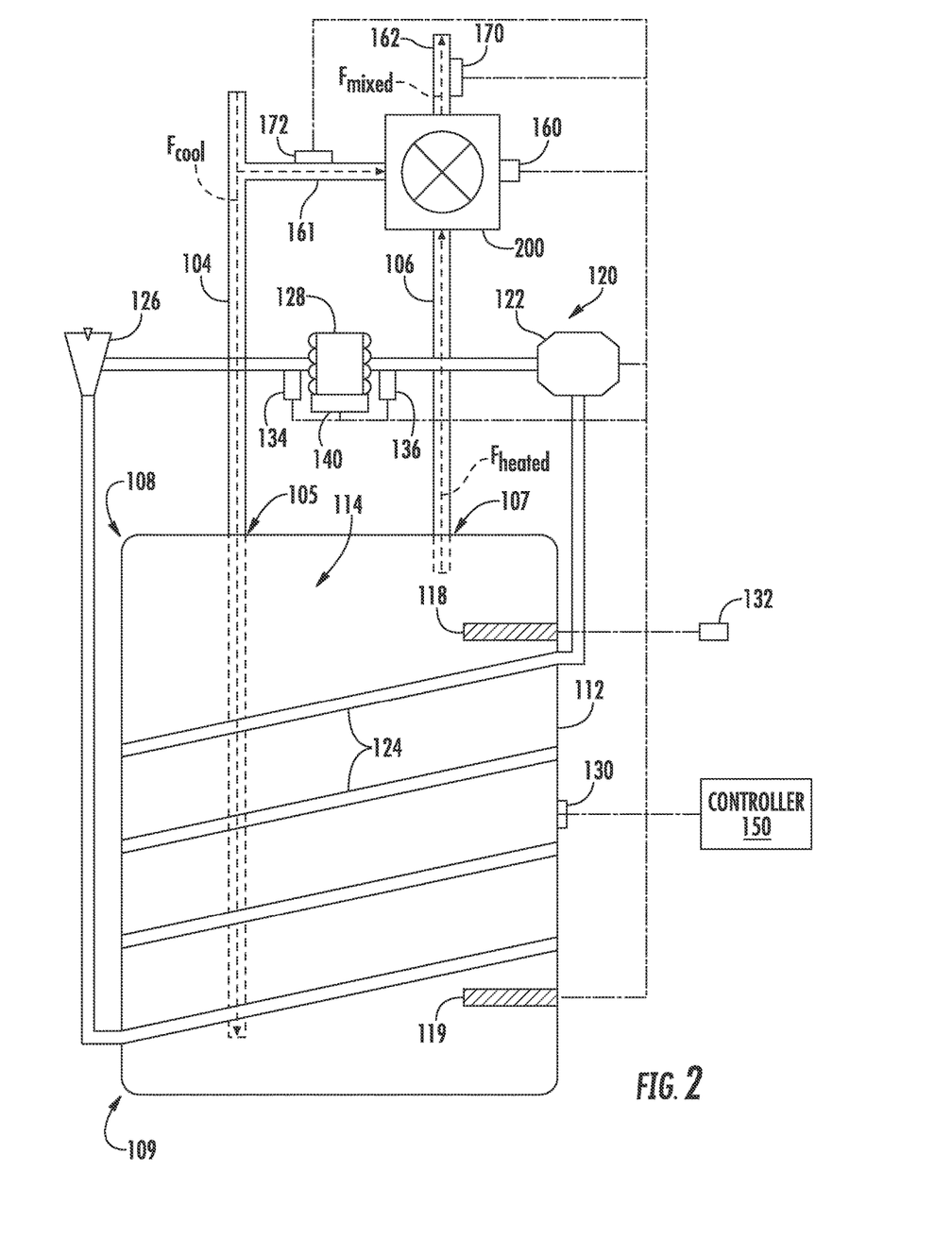
FIG. 2 provides a schematic view of certain components of the exemplary water heater appliance of FIG. 1.

FIG. 1 provides a perspective view of a water heater appliance 100 according to an exemplary embodiment of the present subject matter. FIG. 2 provides a schematic view of certain components of water heater appliance 100. As may be seen in FIGS. 1 and 2, water heater appliance 100 includes a casing 102 and a tank 112 mounted within casing 102. Tank 112 defines an interior volume 114 for heating water therein.

Water heater appliance 100 also includes an inlet conduit 104 and an outlet conduit 106 that are both in fluid communication with tank 112 within casing 102. As an example, cold water from a water source, e.g., a municipal water supply or a well, enters water heater appliance 100 through inlet conduit 104. From inlet conduit 104, such cold water enters interior volume 114 of tank 112 wherein the water is heated to generate heated water. Such heated water exits water heater appliance 100 at outlet conduit 106 and, e.g., is supplied to a bath, shower, sink, or any other suitable feature.

As may be seen in FIG. 1, water heater appliance 100 extends between a top portion 108 and a bottom portion 109 along a vertical direction V. Thus, water heater appliance 100 is generally vertically oriented. Water heater appliance 100 can be leveled, e.g., such that casing 102 is plumb in the vertical direction V, in order to facilitate proper operation of water heater appliance 100.

A drain pan 110 is positioned at bottom portion 109 of water heater appliance 100 such that water heater appliance 100 sits on drain pan 110. Drain pan 110 sits beneath water heater appliance 100 along the vertical direction V, e.g., to collect water that leaks from water heater appliance 100 or water that condenses on an evaporator 128 of water heater appliance 100. It should be understood that water heater appliance 100 is provided by way of example only and that the present subject matter may be used with any suitable water heater appliance.

Turning now to FIG. 2, water heater appliance 100 includes an upper heating element 118, a lower heating element 119 and a sealed system 120 for heating water within interior volume 114 of tank 112. Thus, water heater appliance 100 is commonly referred to as a "heat pump water heater appliance." Upper and lower heating elements 118 and 119 can be any suitable heating elements. For example, upper heating element 118 and/or lower heating element 119 may be an electric resistance element, a microwave element, an induction element, or any other suitable heating element or combination thereof. Lower heating element 119 may also be a gas burner.

Sealed system 120 includes a compressor 122, a condenser 124, a throttling device 126 and an evaporator 128. Condenser 124 is thermally coupled or assembled in a heat exchange relationship with tank 112 in order to heat water within interior volume 114 of tank 112 during operation of sealed system 120. In particular, condenser 124 may be a conduit coiled around and mounted to tank 112. During operation of sealed system 120, refrigerant exits evaporator 128 as a fluid in the form of a superheated vapor and/or high quality vapor mixture. Upon exiting evaporator 128, the refrigerant enters compressor 122 wherein the pressure and temperature of the refrigerant are increased such that the refrigerant becomes a superheated vapor. The superheated vapor from compressor 122 enters condenser 124 wherein it transfers energy to the water within tank 112 and condenses into a saturated liquid and/or high quality liquid vapor mixture. This high quality/saturated liquid vapor mixture exits condenser 124 and travels through throttling device 126 that is configured for regulating a flow rate of refrigerant therethrough. Upon exiting throttling device 126, the pressure and temperature of the refrigerant drop at which time the refrigerant enters evaporator 128 and the cycle repeats itself. In certain exemplary embodiments, throttling device 126 may be an electronic expansion valve (EEV).

A fan or air handler 140 may assist with heat transfer between air about water heater appliance 100, e.g., within casing 102, and refrigerant within evaporator 128. Air handler 140 may be positioned within casing 102 on or adjacent evaporator 128. Thus, when activated, air handler 140 may direct a flow of air towards or across evaporator 128, and the flow of air from air handler 140 may assist with heating refrigerant within evaporator 128. Air handler 140 may be any suitable type of air handler, such as an axial or centrifugal fan.

Water heater appliance 100 also includes a tank temperature sensor 130. Tank temperature sensor 130 is configured for measuring a temperature of water within interior volume 114 of tank 112. Tank temperature sensor 130 can be positioned at any suitable location within or on water heater appliance 100. For example, tank temperature sensor 130 may be positioned within interior volume 114 of tank 112 or may be mounted to tank 112 outside of interior volume 114 of tank 112. When mounted to tank 112 outside of interior volume 114 of tank 112, tank temperature sensor 130 can be configured for indirectly measuring the temperature of water within interior volume 114 of tank 112. For example, tank temperature sensor 130 can measure the temperature of tank 112 and correlate the temperature of tank 112 to the temperature of water within interior volume 114 of tank 112. Tank temperature sensor 130 may also be positioned at or adjacent top portion 108 of water heater appliance 100, e.g., at or adjacent an inlet of outlet conduit 106.

Tank temperature sensor 130 can be any suitable temperature sensor. For example, tank temperature sensor 130 may be a thermocouple or a thermistor. As may be seen in FIG. 2, tank temperature sensor 130 may be the only temperature sensor positioned at or on tank 112 that is configured for measuring the temperature of water within interior volume 114 of tank 112 in certain exemplary embodiments. In alternative exemplary embodiments, additional temperature sensors may be positioned at or on tank 112 to assist tank temperature sensor 130 with measuring the temperature of water within interior volume 114 of tank 112, e.g., at other locations within interior volume 114 of tank 112.

Water heater appliance 100 also includes an ambient temperature sensor 132, an evaporator inlet temperature sensor 134 and an evaporator outlet temperature sensor 136. Ambient temperature sensor 132 is configured for measuring a temperature of air about water heater appliance 100. Ambient temperature sensor 132 can be positioned at any suitable location within or on water heater appliance 100. For example, ambient temperature sensor 132 may be mounted to casing 102, e.g., at or adjacent top portion 108 of water heater appliance 100. Ambient temperature sensor 132 can be any suitable temperature sensor. For example, ambient temperature sensor 132 may be a thermocouple or a thermistor.

Evaporator inlet temperature sensor 134 is configured for measuring a temperature of refrigerant at or adjacent inlet of evaporator 128. Thus, evaporator inlet temperature sensor 134 may be positioned at or adjacent inlet of evaporator 128, as shown in FIG. 2. For example, evaporator inlet temperature sensor 134 may be mounted to tubing that directs refrigerant into evaporator 128, e.g., at or adjacent inlet of evaporator 128. When mounted to tubing, evaporator inlet temperature sensor 134 can be configured for indirectly measuring the temperature of refrigerant at inlet of evaporator 128. For example, evaporator inlet temperature sensor 134 can measure the temperature of the tubing and correlate the temperature of the tubing to the temperature of refrigerant at inlet of evaporator 128. Evaporator inlet temperature sensor 134 can be any suitable temperature sensor. For example, evaporator inlet temperature sensor 134 may be a thermocouple or a thermistor.

Evaporator outlet temperature sensor 136 is configured for measuring a temperature of refrigerant at or adjacent outlet of evaporator 128. Thus, evaporator outlet temperature sensor 136 may be positioned at or adjacent outlet of evaporator 128, as shown in FIG. 2. For example, evaporator outlet temperature sensor 136 may be mounted to tubing that directs refrigerant out of evaporator 128, e.g., at or adjacent outlet of evaporator 128. When mounted to tubing, evaporator outlet temperature sensor 136 can be configured for indirectly measuring the temperature of refrigerant at outlet of evaporator 128. For example, evaporator outlet temperature sensor 136 can measure the temperature of the tubing and correlate the temperature of the tubing to the temperature of refrigerant at outlet of evaporator 128. Evaporator outlet temperature sensor 136 can be any suitable temperature sensor. For example, evaporator outlet temperature sensor 136 may be a thermocouple or a thermistor.

Water heater appliance 100 further includes a controller 150 that is configured for regulating operation of water heater appliance 100. Controller 150 is in, e.g., operative, communication with upper heating element 118, lower heating element 119, compressor 122, tank temperature sensor 130, ambient temperature sensor 132, evaporator inlet temperature sensor 134, evaporator outlet temperature sensor 136, and air handler 140. Thus, controller 150 may selectively activate upper and lower heating elements 118 and 119 and/or compressor 122 in order to heat water within interior volume 114 of tank 112, e.g., in response to signals from tank temperature sensor 130, ambient temperature sensor 132, evaporator inlet temperature sensor 134 and/or evaporator outlet temperature sensor 136.

Controller 150 includes memory and one or more processing devices such as microprocessors, CPUs or the like, such as general or special purpose microprocessors operable to execute programming instructions or micro-control code associated with operation of water heater appliance 100. The memory can represent random access memory such as DRAM, or read only memory such as ROM or FLASH. The processor executes programming instructions stored in the memory. The memory can be a separate component from the processor or can be included onboard within the processor. Alternatively, controller 150 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Controller 150 may operate upper heating element 118, lower heating element 119 and/or compressor 122 in order to heat water within interior volume 114 of tank 112. As an example, a user may select or establish a set temperature, $t_s$, for water within interior volume 114 of tank 112, or the set temperature $t_s$ for water within interior volume 114 of tank 112 may be a default value. Based upon the set temperature $t_s$ for water within interior volume 114 of tank 112, controller 150 may selectively activate upper heating element 118, lower heating element 119 and/or compressor 122 in order to heat water within interior volume 114 of tank 112 to the set temperature $t_s$ for water within interior volume 114 of tank 112. The set temperature $t_s$ for water within interior volume 114 of tank 112 may be any suitable temperature. For example, the set temperature $t_s$ for water within interior volume 114 of tank 112 may be between about one hundred degrees Fahrenheit and about one hundred and eighty-degrees Fahrenheit. As used herein with regards to temperature approximations, the term "about" means within ten degrees of the stated temperature.

Figure 3:
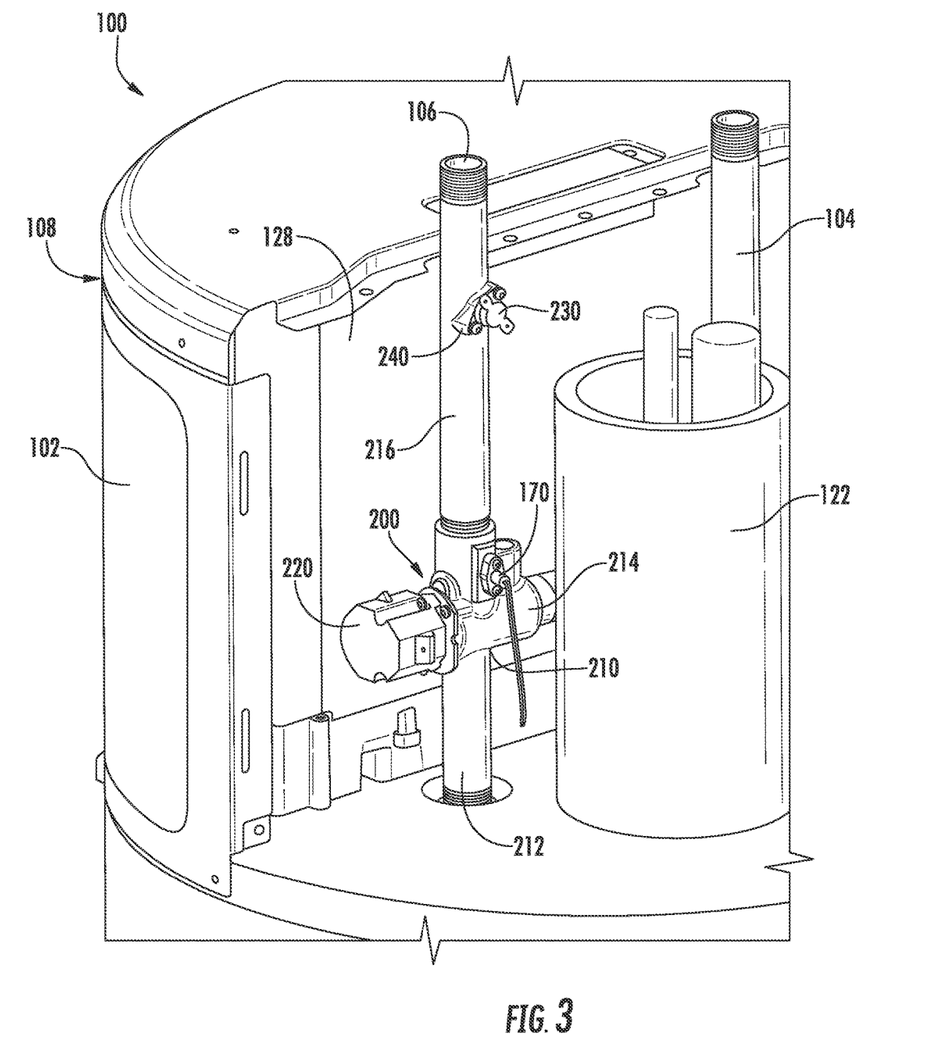
FIG. 3 provides a partial, perspective view of the exemplary water heater appliance of FIG. 1.

As may be seen in FIG. 2, water heater appliance 100 also includes a mixing valve 200 and a mixed water outlet conduit 162. Mixing valve 200 is in fluid communication with inlet conduit 104 via a bypass conduit 161, outlet conduit 106, and mixed water outlet conduit 162. As discussed in greater detail below, mixing valve 200 is configured for selectively directing water from inlet conduit 104 and outlet conduit 106 into mixed water outlet conduit 162 in order to regulate a temperature of water within mixed water outlet conduit 162. Mixing valve 200 may be positioned or disposed within casing 102 of water heater appliance 100, e.g., such that mixing valve 200 is integrated within water heater appliance 100. Compressor 122 and/or evaporator 128 may also be disposed within casing 102, as shown in FIG. 3.

As an example, mixing valve 200 can selectively adjust between a first position and a second position. In the first position, mixing valve 200 can permit a first flow rate of relatively cool water from inlet conduit 104 (shown schematically with arrow labeled $F_{cool}$ in FIG. 2) into mixed water outlet conduit 162 and mixing valve 200 can also permit a first flow rate of relatively hot water from outlet conduit 106 (shown schematically with arrow labeled $F_{heated}$ in FIG. 2) into mixed water outlet conduit 162. In such a manner, water within mixed water outlet conduit 162 (shown schematically with arrow labeled $F_{mixed}$ in FIG. 2) can have a first particular temperature when mixing valve 200 is in the first position. Similarly, mixing valve 200 can permit a second flow rate of relatively cool water from inlet conduit 104 into mixed water outlet conduit 162 and mixing valve 200 can also permit a second flow rate of relatively hot water from outlet conduit 106 into mixed water outlet conduit 162 in the second position. The first and second flow rates of the relatively cool water and relatively hot water are different such that water within mixed water outlet conduit 162 can have a second particular temperature when mixing valve 200 is in the second position. In such a manner, mixing valve 200 can regulate the temperature of water within mixed water outlet conduit 162 and adjust the temperature of water within mixed water outlet conduit 162 between the first and second particular temperatures.

It should be understood that, in certain exemplary embodiments, mixing valve 200 is adjustable between more positions than the first and second positions. In particular, mixing valve 200 may be adjustable between any suitable number of positions in alternative exemplary embodiments. For example, mixing valve 200 may be infinitely adjustable in order to permit fine-tuning of the temperature of water within mixed water outlet conduit 162.

Water heater appliance 100 also includes a position sensor 164. Position sensor 164 is configured for determining a position of mixing valve 200. Position sensor 164 can monitor the position of mixing valve 200 in order to assist with regulating the temperature of water within mixed water outlet conduit 162. For example, position sensor 164 can determine when mixing valve 200 is in the first position or the second position in order to ensure that mixing valve 200 is properly or suitably positioned depending upon the temperature of water within mixed water outlet conduit 162 desired or selected. Thus, position sensor 164 can provide feedback regarding the status or position of mixing valve 200.

Position sensor 164 may be any suitable type of sensor. For example, position sensor 164 may be a physical sensor, such as an optical sensor, Hall-effect sensor, etc. In alternative exemplary embodiments, water heater appliance 100 need not include position sensor 164, and controller 150 may determine or measure a motor position of mixing valve 200 based on a previously commanded position of mixing valve 200. Thus, controller 150 may determine that the current position of mixing valve 200 corresponds to a latest position that controller 150 commanded for mixing valve 200 in a previous iteration.

Water heater appliance 100 also includes a mixed water conduit temperature sensor or first temperature sensor 170 and an inlet conduit temperature sensor or second temperature sensor 172. First temperature sensor 170 is positioned on or proximate mixed water outlet conduit 162 and is configured for measuring a temperature of water within mixed water outlet conduit 162. First temperature sensor 170 is also positioned downstream of mixing valve 200. Second temperature sensor 172 is positioned on or proximate inlet conduit 104 or bypass conduit 161 and is configured for measuring a temperature of water within inlet conduit 104 or bypass conduit 161. Second temperature sensor 172 is positioned upstream of mixing valve 200. In certain exemplary embodiments, first temperature sensor 170 and/or second temperature sensor 172 may be positioned proximate or adjacent mixing valve 200. First and second temperature sensors 170, 172 may be any suitable type of temperature sensors, such as a thermistor or thermocouple.

Controller 150 can also operate mixing valve 200 to regulate the temperature of water within mixed water outlet conduit 162. For example, controller 150 can adjust the position of mixing valve 200 in order to regulate the temperature of water within mixed water outlet conduit 162. As an example, a user can select or establish a set-point temperature of mixing valve 200, or the set-point temperature of mixing valve 200 may be a default value. Based upon the set-point temperature of mixing valve 200, controller 150 can adjust the position of mixing valve 200 in order to change or tweak a ratio of relatively cool water flowing into mixed water outlet conduit 162 from inlet conduit 104 and relatively hot water flowing into mixed water outlet conduit 162 from outlet conduit 106. In such a manner, controller 150 can regulate the temperature of water within mixed water outlet conduit 162.

The set-point temperature of mixing valve 200 can be any suitable temperature. For example, the set-point temperature of mixing valve 200 may be between about one hundred degrees Fahrenheit and about one hundred and twenty degrees Fahrenheit. In particular, the set-point temperature of mixing valve 200 may be selected such that the set-point temperature of mixing valve 200 is less than the set-point temperature for water within interior volume 114 of tank 112. In such a manner, mixing valve 200 can utilize water from inlet conduit 104 and outlet conduit 106 to regulate the temperature of water within mixed water outlet conduit 162.

Figure 4:
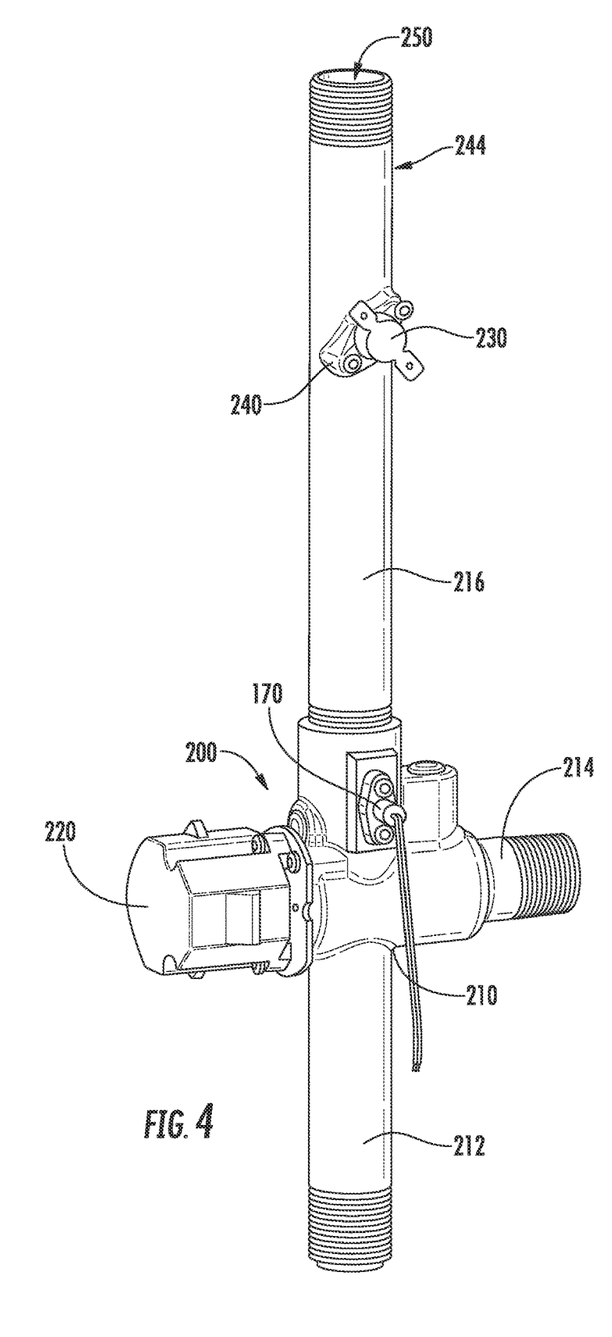
FIG. 4 provides a perspective view of a mixing valve of the exemplary water heater appliance of FIG. 1.

FIG. 3 provides a partial, perspective view of water heater appliance 100. FIG. 4 provides a perspective view of a mixing valve 200 of water heater appliance 100. As may be seen in FIGS. 3 and 4, mixing valve 200 includes a valve body 210. Valve body 210 has a heated water conduit 212, a cold water conduit 214 and a mixed water conduit 216. Mixed water conduit 216 may form at least a portion of mixed water outlet conduit 162. As may be seen in FIG. 3, heated water conduit 212 of valve body 210 is coupled to tank 112 at an outlet 107 of tank 112. As an example, heated water conduit 212 of valve body 210 may be threaded to tank 112 at outlet 107 of tank 112 such that heated water conduit 212 of valve body 210 forms at least a portion of outlet conduit 106. Bypass conduit 161 is coupled to cold water conduit 214 of valve body 210. Accordingly, heated water from interior volume 114 of tank 112 may flow into a mixing chamber of valve body 210 via heated water conduit 212 of valve body 210, and cold water from inlet conduit 104 may flow into the mixing chamber of valve body 210 via cold water conduit 214 of valve body 210.

Valve body 210 may be formed such that heated water conduit 212, cold water conduit 214 and mixed water conduit 216 of valve body 210 are integrally formed with one another. Thus, e.g., valve body 210 may be cast from a suitable metal, such as steel, aluminum, bronze, etc. Valve body 210 may also be formed of any other suitable rigid and/or ductile material, such as a plastic, a composite, etc., that is suitable for shipping and installing water heater appliance 100 without fracturing valve body 210.

Mixing valve 200 further includes a motor 220, such as a stepper motor. Thus, mixing valve 200 is generally referred to as an "electronic mixing valve." Motor 220 is coupled to a plunger (not shown) within valve body 210, and motor 220 is operable to adjust a position of the plunger within valve body 210. As an example, the plunger may be positioned such that the plunger blocks or significantly limits fluid flow from heated water conduit 212 of valve body 210 when the plunger is in a fully open position. Thus, all or most of water flowing to mixed water conduit 216 of valve body 210 is from cold water conduit 214, and water within mixed water conduit 216 of valve body 210 is at or about the temperature of water within cold water conduit 214 when the plunger is in the fully open position. Conversely, the plunger may be positioned such that the plunger blocks or significantly limits fluid flow from cold water conduit 214 of valve body 210 when the plunger is in a fully closed position. Thus, all or most of water flowing to mixed water conduit 216 of valve body 210 is from heated water conduit 212 and water within mixed water conduit 216 of valve body 210 is at or about the temperature of water within heated water conduit 212 when the plunger is in the fully closed position.

Motor 220 may adjust the plunger between the open and closed positions. In addition, motor 220 may adjust the plunger to any suitable position between the open and closed positions. In such a manner, motor 220 may adjust the temperature of water exiting mixing valve 200 at mixed water conduit 216 of valve body 210 to any suitable temperature between the temperature of water within cold water conduit 214 and the temperature of water within heated water conduit 212.

As may be seen in FIGS. 3 and 4, mixing valve 200 also include a thermal safety sensor 230. Thermal safety sensor 230 may be any suitable type of temperature sensor or switch. For example, thermal safety sensor 230 may be a bimetal switch, a thermal cutoff (TCO), a thermistor, a thermocouple, etc. Thermal safety sensor 230 may be in communication with controller 150, e.g., such that controller 150 deactivates compressor 122, upper heating element 118 and/or lower heating element 119 when temperature measurements from thermal safety sensor 230 exceed a temperature limit. As another example, thermal safety sensor 230 may be directly wired to compressor 122, upper heating element 118 and/or lower heating element 119, e.g., such that thermal safety sensor 230 interrupts power supply to compressor 122, upper heating element 118 and/or lower heating element 119 when temperature measurements from thermal safety sensor 230 exceed the temperature limit. The temperature limit may be any suitable temperature. For example, the temperature limit may be one-hundred and forty degrees Fahrenheit, one-hundred and fifty degrees Fahrenheit, one-hundred and sixty degrees Fahrenheit, etc. As another example, the temperature limit may be selected such that the temperature limit is greater than the set temperature of mixing valve 200 and less than the set temperature $t_s$ for water within interior volume 114 of tank 112.

Thermal safety sensor 230 is positioned downstream of mixing valve 200 on mixed water conduit 216. As an example, thermal safety sensor 230 may be positioned on mixed water conduit 216 no less than six inches downstream of mixing valve 200. As may be seen in FIGS. 3 and 4, a thermal mass 240 is positioned or formed on mixed water conduit 216. Thermal safety sensor 230 is positioned at or on thermal mass 240. As discussed in greater detail below, thermal mass 240 is configured for assisting with avoiding nuisance tripping of thermal safety sensor 230, e.g., when temperature measurements from thermal safety sensor 230 momentarily or briefly exceed the temperature limit.

Figure 5:
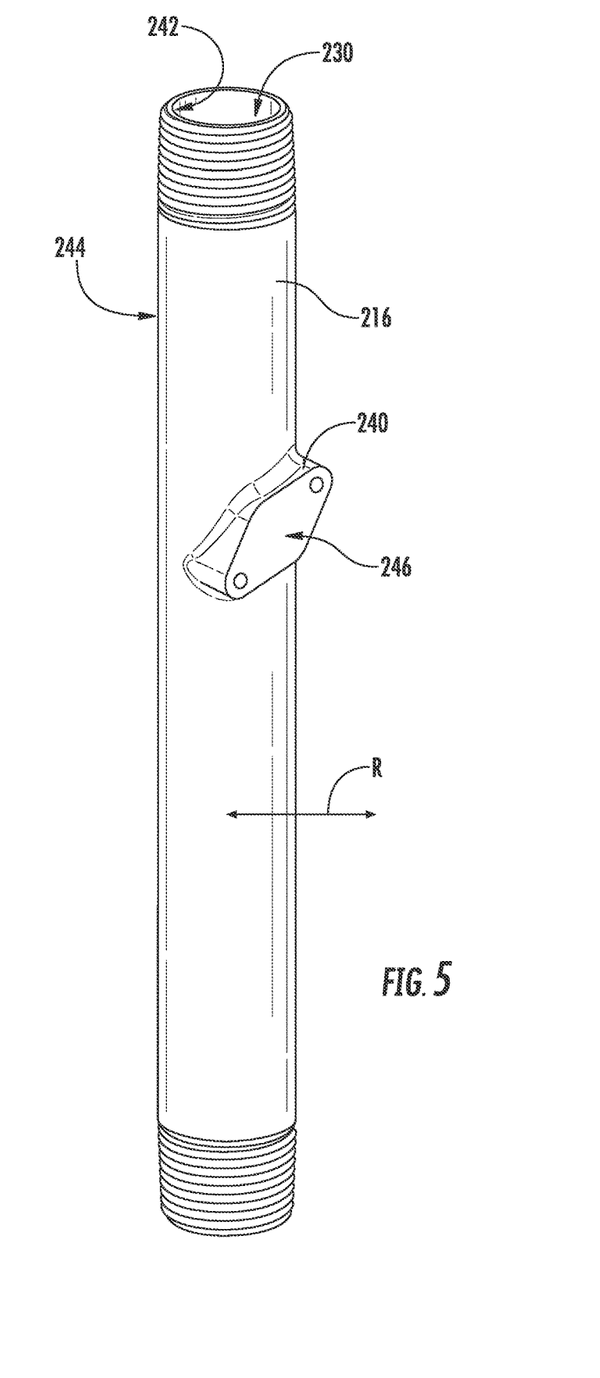
FIG. 5 provides a perspective view of a mixed water conduit of the exemplary water heater appliance of FIG. 1.
Figure 6:
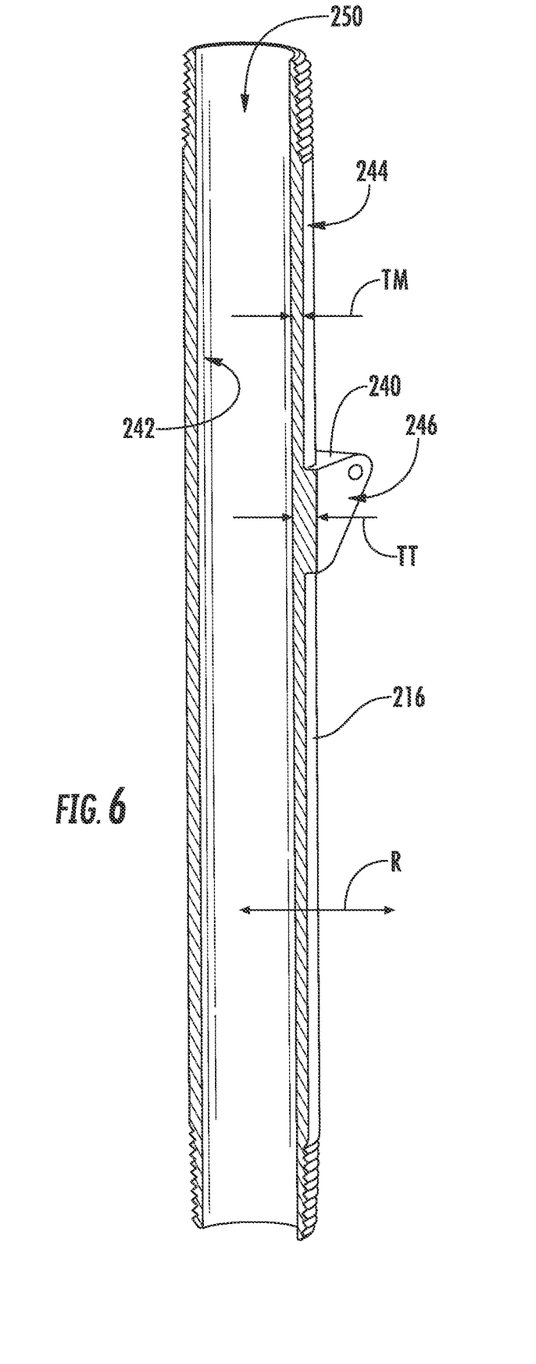
FIG. 6 provides a section view of the mixed water conduit of the exemplary water heater appliance of FIG. 1.

FIG. 5 provides a perspective view of mixed water conduit 216. FIG. 6 provides a section view of mixed water conduit 216. It should be understood that, while described in greater detail below in the context of water heater appliance 100, mixed water conduit 216, thermal safety sensor 230 and/or thermal mass 240 may be used in any other suitable water heater appliance, in alternative exemplary embodiments.

As shown in FIGS. 5 and 6, thermal mass 240 may be integrally formed on or with mixed water conduit 216. Thus, thermal mass 240 and mixed water conduit 216 may be formed of or with a single piece of continuous metal, such as steel, aluminum, copper, etc. As an example, thermal mass 240 may be machined and/or cast on mixed water conduit 216. In alternative exemplary embodiments, thermal mass 240 may be a separate piece of material mounted or secured to mixed water conduit 216. Thus, e.g., thermal mass 240 may be constructed of or with a first piece of material, and mixed water conduit 216 may be constructed of or with a second piece of material. The first and second pieces of material may be different metals or the same metal. For example, thermal mass 240 may be constructed of or with bronze, and mixed water conduit 216 may be constructed of or with steel.

As discussed above, thermal mass 240 may assist with avoiding nuisance tripping of thermal safety sensor 230. As an example, thermal safety sensor 230 may be positioned on and/or mounted to thermal mass 240 such that thermal mass 240 is positioned between thermal safety sensor 230 and an inner surface 242 of mixed water conduit 216. In particular, mixed water conduit 216 may be a pipe with a circular cross-section, and thermal mass 240 may be positioned between thermal safety sensor 230 and inner surface 242 of mixed water conduit 216 along a radial direction R. Thus, thermal mass 240 provides additional solid material, such as a suitable metal, between inner surface 242 of mixed water conduit 216 and thermal safety sensor 230.

Turning now to FIG. 6, mixed water conduit 216 also has an outer surface 244. Outer surface 244 of mixed water conduit 216 and inner surface 242 of mixed water conduit 216 are spaced apart from each other, e.g., along the radial direction R. Inner surface 242 of mixed water conduit 216 may define an interior volume 250 of mixed water conduit 216. Liquid is contained within and flows through interior volume 250 of mixed water conduit 216. Thus, heated water within interior volume 250 of mixed water conduit 216 may heat mixed water conduit 216 at inner surface 242 of mixed water conduit 216. Heat transfer between mixed water conduit 216 and thermal mass 240 may also heat thermal mass 240. When thermal mass 240 reaches the temperature limit, thermal safety sensor 230 may trip, and, e.g., compressor 122, upper heating element 118 and/or lower heating element may be deactivated.

Figure 7:
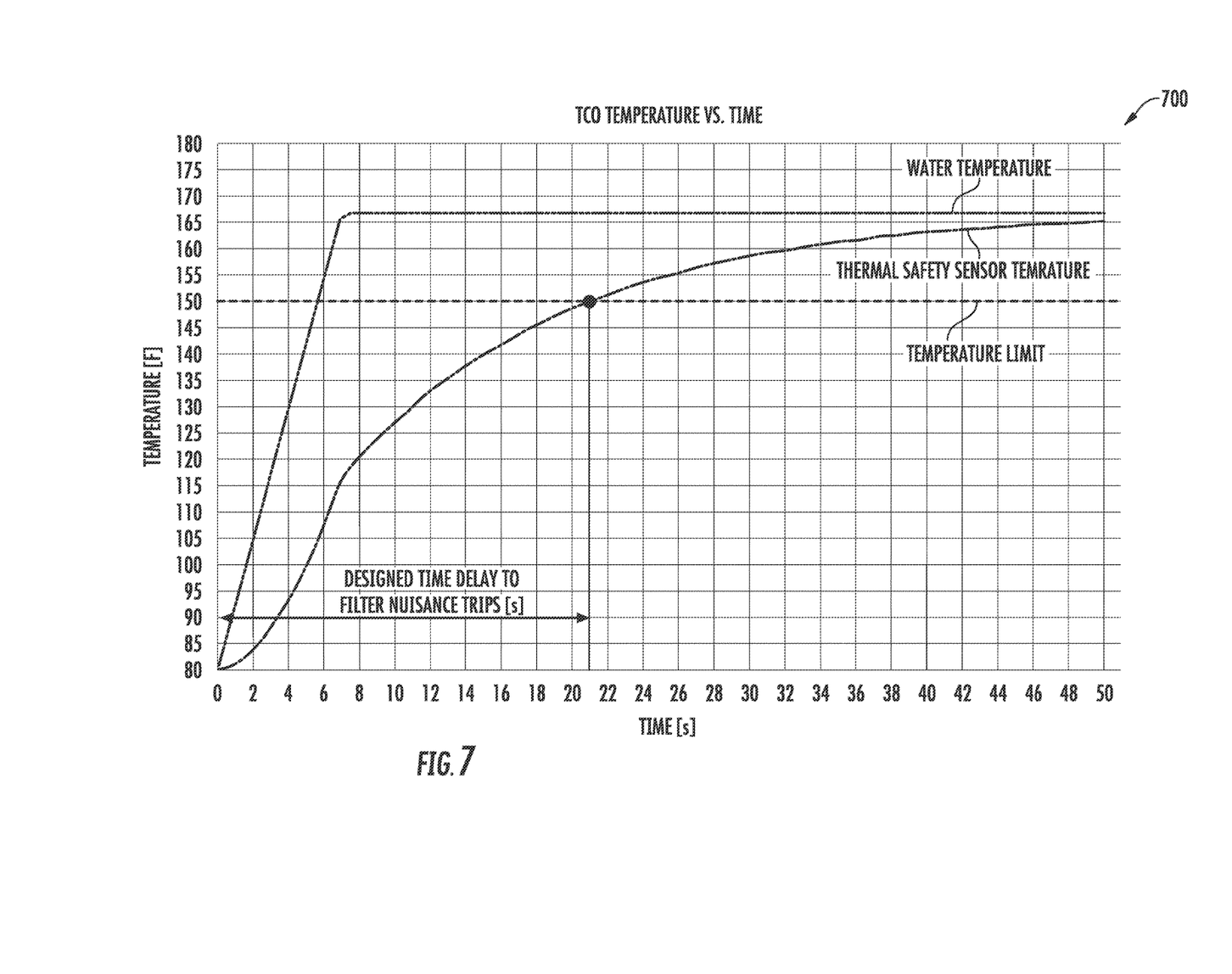
FIGS. 7 and 8 illustrate exemplary plots of time versus temperature for the exemplary water heater appliance of FIG. 1.
Figure 8:
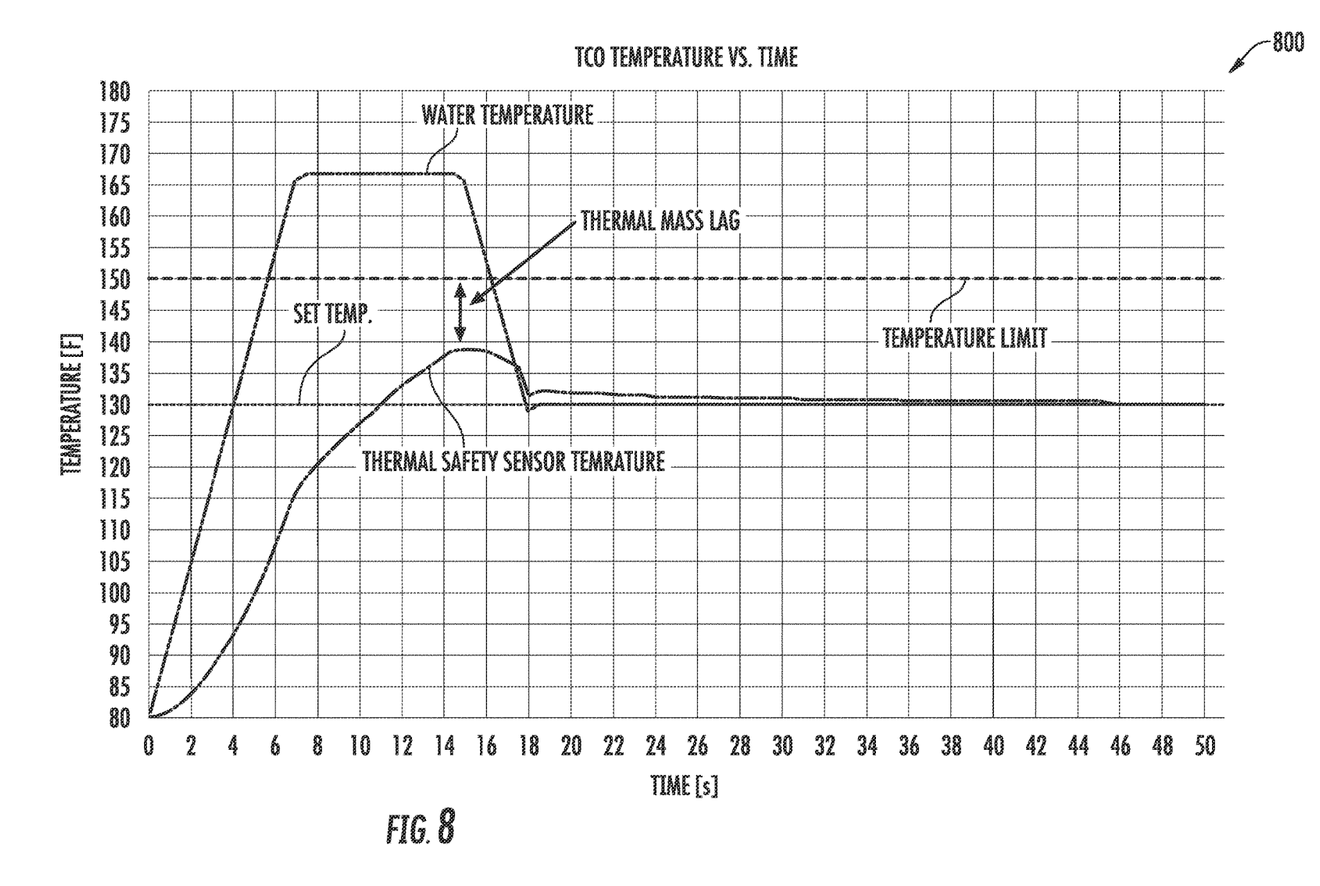

Thus, positioning thermal safety sensor 230 on or at thermal mass 240, may provide a lag time during which nuisance tripping of thermal safety sensor 230 is avoided or limited. Such features are discussed in greater detail below in the context of FIGS. 7 and 8. FIGS. 7 and 8 illustrate exemplary plots 700, 800 of time versus temperature for water heater appliance 100. In FIG. 8, mixing valve 200 is operating normally. Conversely, mixing valve 200 is not operating normally in FIG. 7. As may be seen in FIG. 8, the water temperature, e.g., within mixed water conduit 216, may spike rapidly during an initial portion of a water draw, e.g., until mixing valve 200 adjusts a plunger of mixing valve 200 to a suitable or correct position. Turning to FIG. 7, the water temperature may remain above the temperature limit, e.g., if motor 220 is malfunctioning, the plunger of mixing valve 200 is stuck, etc. As shown in FIG. 8, thermal mass 240 may assist with providing a temperature lag that limits or prevents nuisance tripping of thermal safety sensor 230 due to momentary or brief temperature spikes of water within mixed water conduit 216. In certain exemplary embodiments, a time lag provided by thermal mass 240 may be between ten second and thirty seconds, between ten second and twenty second, etc.

Thermal mass 240 may be suitably sized to assist with limiting or preventing nuisance tripping of thermal safety sensor 230. For example, as shown in FIG. 6, thermal mass 240 may have a thickness, TT, that is greater than a thickness, TM, of mixed water conduit 216. The thickness TM of mixed water conduit 216 may be defined between inner surface 242 of mixed water conduit 216 and outer surface 244 of mixed water conduit 216, and the thickness TT of thermal mass 240 may be defined between inner surface 242 of mixed water conduit 216 and an outer surface 246 of thermal mass 240.

As discussed above, the thickness TT of thermal mass 240 may be greater than the thickness TM of mixed water conduit 216. In such a manner, thermal mass 240 may assist with limiting or preventing nuisance tripping of thermal safety sensor 230. The thickness TT of thermal mass 240 may be greater than the thickness TM of mixed water conduit 216 by any suitable amount. For example, the thickness TT of thermal mass 240 may be no less than twice as large as the thickness TM of mixed water conduit 216. Thermal safety sensor 230 may positioned on or at outer surface 246 of thermal mass 240.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A water heater appliance, comprising:
   a tank;
   a heating element operable to heat water within the tank;
   a heated water conduit extending from the tank;
   a mixing valve coupled to the heated water conduit;
   a mixed water conduit extending from the mixing valve, the mixed water conduit defining a thickness between an inner surface of the mixed water conduit and an outer surface of the mixed water conduit;
   a temperature sensor positioned at the mixed water conduit, the temperature sensor configured for measuring a temperature of water within the mixed water conduit;
   a controller in communication with the mixing valve and the temperature sensor, the controller operable to adjust the mixing valve in response to the temperature of water within the mixed water conduit measured by the temperature sensor;
   a thermal mass positioned on the mixed water conduit, the thermal mass spaced from the temperature sensor on the mixed water conduit, the thermal mass and the mixed water conduit having a total thickness defined between the inner surface of the mixed water conduit and an outer surface of the thermal mass, the total thickness of the thermal mass and the mixed water conduit being greater than the thickness of the mixed water conduit; and
   a thermal safety sensor positioned at the outer surface the thermal mass, the thermal safety sensor operable to deactivate the heating element,
   wherein the total thickness of the thermal mass and the mixed water conduit is selected to provide a temperature lag that prevents nuisance tripping of the thermal safety sensor due to momentary or brief temperature spikes of water within the mixed water conduit; and
   wherein the thermal mass serves as the sole connection point for the thermal safety sensor to the mixed water conduit.

2. The water heater appliance of claim 1, wherein the thermal mass and the mixed water conduit are formed of a single piece of continuous metal.

3. The water heater appliance of claim 1, wherein the thermal mass is machined or cast on the mixed water conduit.

4. The water heater appliance of claim 1, wherein the total thickness of the thermal mass and the mixed water conduit is no less than twice as large as the thickness of the mixed water conduit.

5. The water heater appliance of claim 1, wherein the thermal mass is constructed of a first material and the mixed water conduit is constructed of a second material, the first and second materials being different.

6. The water heater appliance of claim 5, wherein the first and second materials are different metals.

7. The water heater appliance of claim 1, further comprising a casing, the tank disposed within the casing, the mixing valve positioned within the casing above the tank.

8. The water heater appliance of claim 7, wherein the mixed water conduit extends from the mixing valve through the casing at a top portion of the casing.

9. The water heater appliance of claim 1, wherein the thermal safety sensor is a bimetal switch or a thermal cutoff (TCO) and the temperature sensor is a thermistor or a thermocouple.

10. A water heater appliance, comprising:
    a casing;
    a tank disposed within the casing;
    a heating element operable to heat water within the tank;
    a heated water conduit extending from the tank;
    a mixing valve positioned within the casing and coupled to the heated water conduit;
    a mixed water conduit extending from the mixing valve;
    a temperature sensor positioned at the mixed water conduit, the temperature sensor configured for measuring a temperature of water within the mixed water conduit;
    a controller in communication with the mixing valve and the temperature sensor, the controller operable to adjust the mixing valve in response to the temperature of water within the mixed water conduit measured by the temperature sensor;
    a thermal mass positioned on the mixed water conduit at an outer surface of the mixed water conduit, the thermal mass spaced from the temperature sensor on the mixed water conduit; and
    a thermal safety sensor positioned on the thermal mass such that the thermal mass is positioned between the thermal safety sensor and an inner surface of the mixed water conduit, the thermal safety sensor operable to deactivate the heating element,
    wherein the thermal mass is configured to provide a temperature lag that prevents nuisance tripping of the thermal safety sensor due to momentary or brief temperature spikes of water within the mixed water conduit, wherein the thermal mass and the mixed water conduit have a total thickness that is greater than a thickness of the mixed water conduit, the thickness of the mixed water conduit defined between the inner surface of the mixed water conduit and an outer surface of the mixed water conduit, the total thickness of the thermal mass and the mixed water conduit defined between the inner surface of the mixed water conduit and an outer surface of the thermal mass; and
    wherein the thermal mass serves as the sole connection point for the thermal safety sensor to the mixed water conduit.

11. The water heater appliance of claim 10, wherein the thermal mass and the mixed water conduit are formed of a single piece of continuous metal.

12. The water heater appliance of claim 10, wherein the thermal mass is machined or cast on the mixed water conduit.

13. The water heater appliance of claim 10, wherein the total thickness of the thermal mass and the mixed water conduit is no less than twice as large as the thickness of the mixed water conduit.

14. The water heater appliance of claim 10, wherein the thermal mass is constructed of a first material and the mixed water conduit is constructed of a second material, the first and second materials being different.

15. The water heater appliance of claim 14, wherein the first and second materials are different metals.

16. The water heater appliance of claim 10, wherein the mixed water conduit extends from the mixing valve through the casing at a top portion of the casing.

17. The water heater appliance of claim 10, wherein the thermal safety sensor is a bimetal switch or a thermal cutoff (TCO) and the temperature sensor is a thermistor or a thermocouple.

\* \* \* \* \*